US012530941B2

(12) United States Patent
Loader et al.

(10) Patent No.: US 12,530,941 B2
(45) Date of Patent: Jan. 20, 2026

(54) GAMING DEVICE WITH WAGER OPTIONS ASSOCIATED WITH TRIGGER SYMBOL VERSIONS

(71) Applicant: Aristocrat Technologies Australia Pty Limited, North Ryde (AU)

(72) Inventors: James Loader, Springfield (AU); Rajni Choudhary, Haryana (IN); Geoffrey Richardson, Baulkham Hills (AU); Benjamin Tinworth, Wollstonecraft (AU); Stephen Jones-McQueen, North Ryde (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 264 days.

(21) Appl. No.: 18/204,147

(22) Filed: May 31, 2023

(65) Prior Publication Data

US 2024/0104995 A1 Mar. 28, 2024

(30) Foreign Application Priority Data

Sep. 28, 2022 (AU) .................................. 2022241516

(51) Int. Cl.
*G07F 17/32* (2006.01)
(52) U.S. Cl.
CPC ........ *G07F 17/3213* (2013.01); *G07F 17/323* (2013.01); *G07F 17/3267* (2013.01)
(58) Field of Classification Search
CPC .............. G07F 17/3213; G07F 17/323; G07F 17/3258; G07F 17/3267; G07F 17/34
See application file for complete search history.

(56) References Cited

U.S. PATENT DOCUMENTS

| 6,186,894 | B1* | 2/2001 | Mayeroff | G07F 17/34 463/16 |
| 8,251,794 | B2* | 8/2012 | O'Halloran | G07F 17/3244 463/16 |
| 2012/0172107 | A1* | 7/2012 | Acres | G07F 17/34 463/16 |
| 2014/0274259 | A1* | 9/2014 | Gold | G07F 17/3244 463/13 |
| 2018/0286183 | A1* | 10/2018 | Davis | G07F 17/34 |
| 2019/0073876 | A1* | 3/2019 | Satterlie | G07F 17/3209 |

(Continued)

*Primary Examiner* — Justin L Myhr
(74) *Attorney, Agent, or Firm* — Armstrong Teasdale LLP

(57) ABSTRACT

A gaming device includes a processor and a memory storing symbol data, trigger probability data for wager options, and instructions. The symbol data includes reel strips including positions dynamically configurable with trigger symbols associated with feature games, and trigger symbol sets including different versions of the trigger symbols and corresponding to the wager options. The instructions, when executed, cause the processor to receive a selected wager option; configure the reel strips by selecting a trigger symbol from the trigger symbol set corresponding to the selected wager option for the dynamically configurable positions; select symbols from the configured reel strips for display in symbol positions; control display of the selected symbols; and upon the selected symbols including a trigger symbol associated with a feature game, determine whether the feature game is triggered based on the trigger probability data for the selected wager option and an identity of the trigger symbol.

18 Claims, 10 Drawing Sheets

(56) References Cited

U.S. PATENT DOCUMENTS

| | | | | |
|---|---|---|---|---|
| 2020/0312087 A1* | 10/2020 | Kendall | ............... | G06F 7/588 |
| 2020/0357240 A1* | 11/2020 | Tam | ................ | G07F 17/3213 |
| 2021/0241574 A1* | 8/2021 | Fan | ................ | G07F 17/3211 |

* cited by examiner

|     | Reel Strip 1 | Reel Strip 2 | Reel Strip 3 | Reel Strip 4 | Reel Strip 5 |
| --- | --- | --- | --- | --- | --- |
| 301 | Reel Strip 1 | Reel Strip 2 | Reel Strip 3 | Reel Strip 4 | Reel Strip 5 |
| 302 | A | 10 | Q | 10 | PIC 1 |
| 303 | PIC 3 | J | K | PIC 2 | DYNSCAT |
| 304 | PIC 3 | WILD | 9 | PIC 3 | PIC 3 |
| 305 | PIC 2 | Q | PIC 2 | WILD | Q |
| 306 | K | A | PIC 1 | Q | A |
| 307 | DYNSCAT | DYNSCAT | 10 | A | Q |
| 308 | PIC 3 | PIC 1 | K | A | Q |
| 309 | A | J | WILD | 10 | WILD |
| 310 | J | Q | J | PIC 2 | K |
| 311 | 10 | K | PIC 3 | K | 9 |
| 312 | A | 9 | Q | PIC 1 | DYNSCAT |
| 313 | PIC 3 | K | WILD | DYNSCAT | 10 |
| 314 | 10 | 10 | DYNSCAT | A | 10 |
| 315 | DYNSCAT | DYNSCAT | Q | J | Q |
| 316 | K | WILD | Q | 10 | A |
| 317 | PIC 1 | J | 10 | A | 10 |
| 318 | J | J | A | DYNSCAT | K |
| 319 | Q | A | DYNSCAT | 9 | A |
| 320 | K | PIC 2 | PIC 2 | 9 | J |
| 321 | A | PIC 3 | Q | PIC 2 | PIC 3 |
| 322 | PIC 1 | 9 | A | PIC 1 | DYNSCAT |
| 323 | A | PIC 3 | J | WILD | 10 |
| 324 | J | DYNSCAT | J | PIC 3 | J |
| 325 | Q | Q | DYNSCAT | Q | Q |
| 330 | PIC 2 | Q | 9 | A | PIC 3 |
|     | ... | ... | ... | ... | ... |

Columns: 341, 342, 343, 344, 345

FIG. 3

GAMING DEVICE WITH WAGER OPTIONS ASSOCIATED WITH TRIGGER SYMBOL VERSIONS

CROSS-REFERENCE TO RELATED APPLICATION

This application claims priority to Australian Patent Application No. 2022241516, filed Sep. 28, 2022, the disclosure of which is hereby incorporated by reference herein in its entirety.

FIELD

The present application relates to a gaming device, a method of operating a gaming device and a player interface. The gaming device, the method and the player interface enable the provision of trigger symbol versions associated with wager options.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Certain embodiments describe a gaming device and a method of operating a gaming device where wager options are associated with different versions of trigger symbols. Reel strips are configured with trigger symbols associated with the selected wager option by a processor of the gaming device. In game instances where one or more trigger symbols are selected, the processor determines whether to initiate a feature game based on an identity of the selected trigger symbol(s) and probability data associated with the wager option. In advantageous embodiments, visual elements of the trigger symbols indicate the relative probability of a feature game being initiated.

Certain embodiments also describe a player interface for a gaming device which when operated may trigger one or more of a plurality of feature games. The player interface has an input device for selecting between wager options and reel strips that are configured with different versions of trigger symbols on the basis of the selected wager option. The different versions of the trigger symbol have visual elements that indicate a ranking of the relative probability of triggering one of the feature games based on the wager selected with the input device.

In an embodiment there is described a gaming device comprising an input device operable to select between a plurality of wager options, a random number generator, a display, a processor, and a memory storing (a) symbol data comprising (i) a plurality of reel strips, at least some of the plurality of reel strips comprising dynamically configurable reel strip positions to be configured with trigger symbols including a first trigger symbol associated with a first feature game and a second trigger symbol associated with a second feature game; (ii) a plurality of sets of trigger symbols, each including a different version of the first trigger symbol and the second trigger symbol, each of the plurality of sets of trigger symbols corresponding to a different one of the plurality of wager options; (b) trigger probability data for each of the plurality of wager options; and (c) instructions. When the instructions are executed by the processor, they cause the processor to receive a user input indicative of a wager option selected from the plurality of wager options, configure the reel strips by selecting, using the random number generator, a trigger symbol from the set of trigger symbols corresponding to the user input for each of the dynamically configurable reel strip positions, select symbols from the configured reel strips for display in a plurality of columns of symbol positions, wherein each column of symbol positions corresponds to a reel strip of the plurality of reel strips, control the display to display the selected symbols on the display in the plurality of columns of symbol positions, upon the selected symbols including one or both of the first and second trigger symbols, determine using the random number generator, whether a trigger condition is met in respect of one of a plurality of feature games, wherein the determination by the random number generator is performed based on the trigger probability data for the selected wager option and an identity of the one or both of the first and second trigger symbols, and upon the trigger condition being met in respect of the one of the plurality of feature games, conduct the feature game in respect of which the trigger condition is met. The instructions may direct additional, less, or alternate functionality, including that discussed with respect to other aspects of the disclosure and described elsewhere herein.

In another embodiment there is described a method of operating a gaming device comprising an input device operable to select between a plurality of wager options, a random number generator, a display and a memory storing (a) symbol data comprising (i) a plurality of reel strips, at least some of the plurality of reel strips comprising dynamically configurable reel strip positions to be configured with trigger symbols including a first trigger symbol associated with a first feature game and a second trigger symbol associated with a second feature game; (ii) a plurality of sets of trigger symbols, each including a different version of the first trigger symbol and the second trigger symbol, each of the plurality of sets of trigger symbols corresponding to a different one of the plurality of wager options; and (b) trigger probability data for each of the plurality of wager options. The method comprises receiving a user input indicative of a wager option selected from the plurality of wager options, configuring the reel strips by selecting, using the random number generator, a trigger symbol from the set of trigger symbols corresponding to the user input for each of the dynamically configurable reel strip positions, selecting symbols from the configured reel strips for display in a plurality of columns of symbol positions, wherein each column of symbol positions corresponds to a reel strip of the plurality of reel strips, controlling the display to display the selected symbols on the display in the plurality of columns of symbol positions, upon the selected symbols including one or both of the first and second trigger symbols, determining using the random number generator, whether a trigger condition is met in respect of one of a plurality of feature games, wherein the determination by the random number generator is performed based on the trigger probability data for the selected wager option and an identity of the one or both of the first and second trigger symbols, and upon the trigger condition being met in respect of the one of the plurality of feature games, conducting the feature game in respect of which the trigger condition is met. The method may include additional, less or alternate actions, including those discussed with respect to other aspects of the disclosure and described elsewhere herein.

In another embodiment there is described a player interface for a gaming device comprising an input device operable to receive a user input indicative of a wager option selected from a plurality of wager options, an electronic display, and a plurality of reel strips for visual output to the display, at least some of the plurality of reel strips comprising dynamically configurable reel strip positions configured, based on the selected wager option, with trigger symbols for triggering one or more feature games, wherein the selected wager option determines which set of trigger symbols of a plurality of sets of trigger symbols is used to configure the reel strips, each set of trigger symbols enabling triggering of at least one of the one or more feature games, and each set of trigger symbols comprising a different version of at least a first trigger symbol, wherein each different version of a respective trigger symbol comprises at least one visual element that indicates a ranking of relative probabilities of triggering the one or more feature games based on the selected wager option when visually output on the electronic display. The player interface may include additional, less or alternate functionality, including that discussed with respect to other aspects of the disclosure and described elsewhere herein.

BRIEF DESCRIPTION OF THE DRAWINGS

FIG. 3 illustrates an example reel strip layout.

Corresponding reference numerals used throughout the drawings indicate corresponding parts.

DETAILED DESCRIPTION

Figure 1:
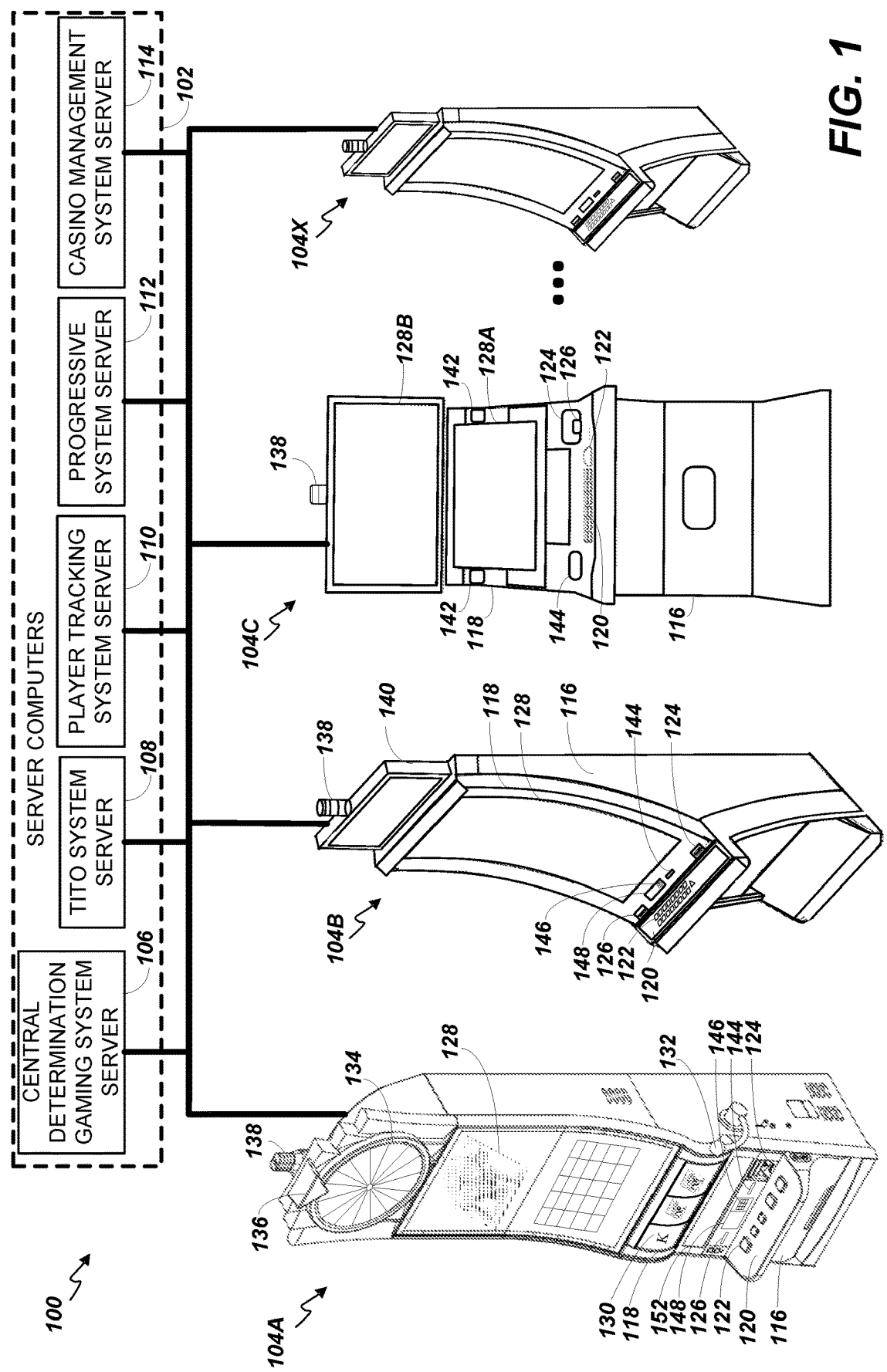
FIG. 1 is an exemplary diagram showing several EGMs networked with various gaming related servers.

Conventional reel games may include base game outcomes in which one or more special symbols are displayed within a reel area and are associated with payout awards and/or features of the reel game (e.g., additional or increased payout values, bonus games, feature games, and the like). In some known reel games, a predefined or preselected number of the special symbols or type of special symbol (e.g., a trigger symbol) may be required to appear in the reel area during one or more plays of the game to trigger a feature. While some variations exist for providing reel games that include special symbols for triggering a feature, the variability and flexibility in utilizing special symbols remain limited, both in terms of the probability that the special symbol will appear and/or trigger the feature, and providing visual elements during the game that associate special symbols with features. A need exists to address these limitations to facilitate increasing overall variability and flexibility of the reel game while maintaining or reducing the computational resources used while doing so and/or controlling increased randomness and payout volatility to meet a designated return-to-player (RTP). Moreover, a need exists for a reel game that, in conjunction with increasing the variability and flexibility of utilizing special symbols to trigger features, provides visual elements that present information related to the backend processing being performed that would not otherwise be known by or provided to a player.

Various example implementations are described herein for providing a reel game in which reel strips are configurable with different sets of trigger symbols between plays of the reel game. The different sets of trigger symbols are associated with different probabilities to trigger feature games upon the appearance of trigger symbols during a play of the reel game. In example implementations, when a play of the reel game is initiated, the reel strips are configured with a set of trigger symbols that are selected based on a wager amount received from a player to initiate the play of the reel game. A greater wager amount received by the player may result in the reel strips being configured with a set of trigger symbols having a greater probability to trigger one or more feature games. Thereby, the reel game is provided with a bet structure that facilitates selectively adjusting the probability that one or more feature games are triggered during any given play of the base game. The example implementations described herein may also provide the reel game with multiple feature games associated with different trigger symbols in each set of trigger symbols. The probability that any of the feature games are triggered upon the appearance of an associated trigger symbol may be determined based on a wager amount (e.g., may increase or decrease with the wager amount). Moreover, the reel game may also be provided with composite or "super" feature games that combine game play characteristics of the individual feature games and may be triggered when the trigger symbols associated with different feature games appear. The probability that any of the composite feature games are triggered upon the appearance of the associated trigger symbols may be also determined based on a wager amount (e.g., may increase or decrease with the wager amount). This game mechanic, which includes wager options to adjust the trigger probability of one or more feature games and/or composite feature games, provides flexibility and variability to the reel game.

One technical problem associated with this game mechanic is that varying the trigger probability of feature games based on wager options may require complex computations. Existing gaming devices may not be configured with the resources to perform these computations in an effective and/or efficient manner while also managing payout volatility and RTP. The systems and methods described herein include the provision of memory that stores reel strips containing reel strip positions that are dynamically configurable with trigger symbols, multiple sets of trigger symbols that each correspond to a selected wager option for a play of the reel game, and trigger probability data for each set of trigger symbols and selected wager option. Based on the selected wager option, the corresponding set of trigger symbols are used to configure the reel strips and the trigger probability data for the set of trigger symbols is used to determine the chance of triggering one or more feature games (or composite feature games) associated with the set of trigger symbols. For example, different weight tables may be used for the different sets of trigger symbols and assign different probabilities of triggering one or more feature games to the different sets. The weight tables may be adjusted to control an overall hit rate and RTP for the wager amount associated with the wager option and the set of trigger symbols. Furthermore, an additional layer of control may be provided by a separate lookup operation or randomly generated outcome that uses a separate or additional weight table to determine whether any of the trigger symbols of the set of trigger symbols used to configure the reel strips will appear during the play of the reel game to provide an opportunity to trigger one or more feature games. Additional control may be provided by including different trigger symbols in each set of trigger symbols, and assigning different probabilities to the different trigger symbols appearing during the play of the reel game and/or to the appearance of the different trigger symbols triggering one or more feature games (or composite feature games). In this way, the systems and methods described herein provide various control tools for implementing the improved game mechanic described herein while maintaining or reducing the computational resources required to do so in an effective and efficient manner and while also managing volatility and RTP in a computationally-effective way.

Another technical problem associated with the game mechanic described herein is displaying information and visual feedback related to the association between different trigger symbols, different wager options, different feature games, and different feature game trigger probability within a limited display area. In some embodiments, the trigger symbols of each set are provided with visual elements that indicate the relative probability of one or more feature games being triggered when those trigger symbols are configured on the reel strips. Upon initiation of a play of the reel game, wager options may be displayed that include the visual elements to present the relative probability information to a player. Moreover, the trigger symbols between sets have common and different visual elements that communicate to the player their relationship to one another and other game elements. For example, the trigger symbols of different sets may be displayed with a common graphical element or object to provide a visual connection between them but are also displayed as different versions of the element or object (e.g., as a different number of elements or objects) that distinguish the trigger symbols of different sets from one another. Furthermore, where different symbols are included in the same set of trigger symbols, these different symbols may be distinguished from one another using different colors or other graphical effects (e.g., different symbol types or different letters on the symbols). Metamorphics or other supplemental graphical elements may also be displayed with common elements, objects, or graphics to associate the metamorphics with the different trigger symbols of the same set and the feature game(s) that the trigger symbols may trigger. In this way, the embodiments described herein may facilitate displaying information and providing visual feedback regarding the trigger symbols and their association with different wager options, different feature games, and different feature game trigger probabilities within a limited display area.

In view thereof, the example embodiments described herein facilitate improving gaming device operation, capability, and user interface features by providing a reel-game mechanic that links sets of trigger symbols to different wager options and different feature game trigger probabilities. Such improvements introduce technical problems, including at least limited resources for efficiently and effectively implementing the mechanic while maintaining payout and RTP rate volatility as well as displaying information and providing visual feedback of the mechanic in a computationally-effective way and within a limited display area. In order to provide a technical solution to these technical problems, the example embodiments described herein provide tools that facilitate providing visual display of information and feedback related to the trigger symbols and their association with different wager options, different feature games, and different feature game trigger probabilities within a limited display area as well as providing the resources to implement the game mechanic described herein in a computationally-effective way while managing and/or controlling the degree of randomness and payout and RTP rate volatility during game play, for example, by storing in memory symbol data for configuring reel strips based on different wager options and trigger probability data for selectively manipulating the probability of triggering the feature games by the different sets of symbols. These control tools provide a computationally-effective way to manage volatility for a designated level of RTP for the reel game, while also improving the usability of the reel game.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
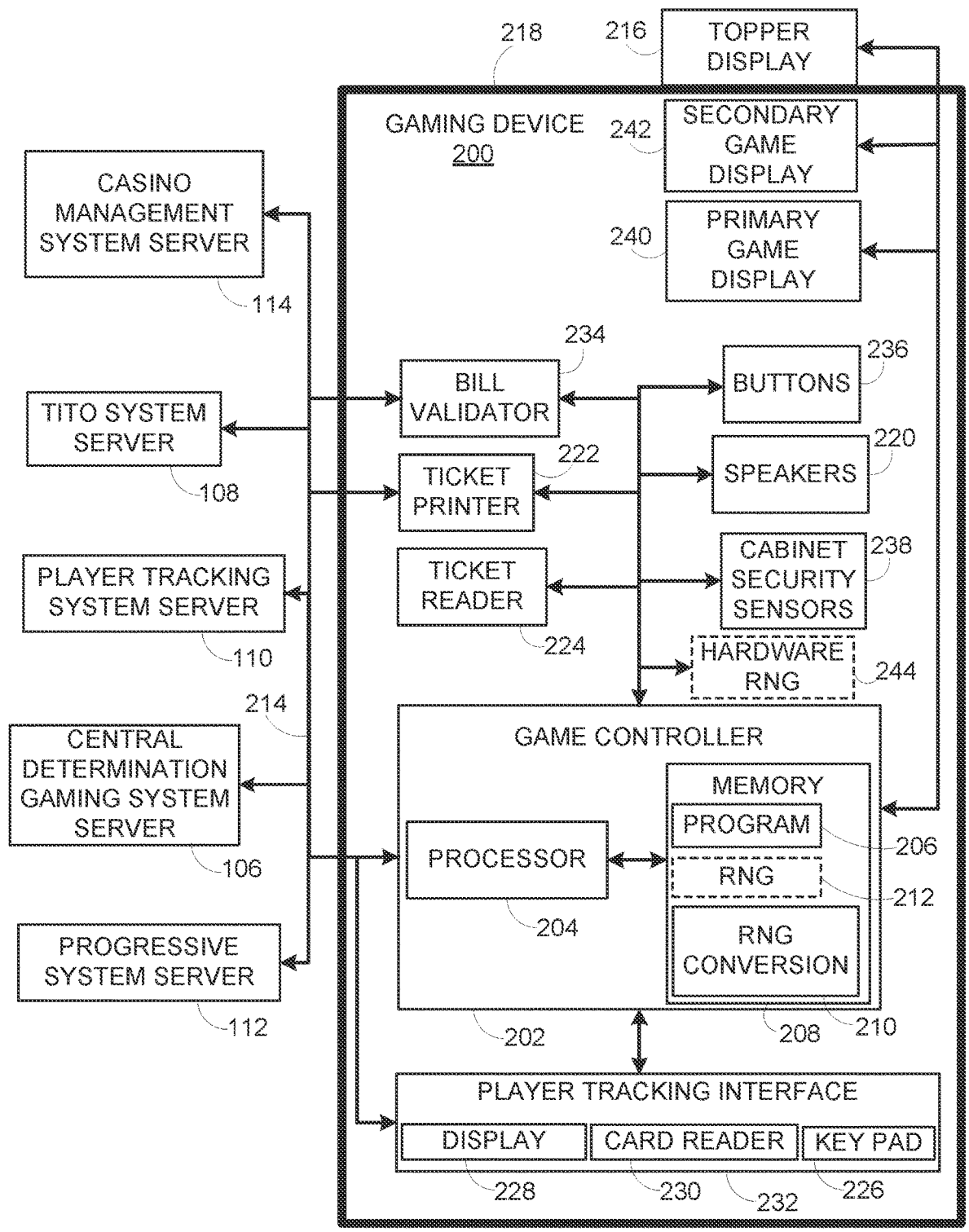
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiments, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

For each game instance, a player may make selections, which may affect play of the game. For example, the player may vary the total amount wagered by selecting from different available wagers. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of a wager amount. The selections available to a player will vary depending on the embodiment.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
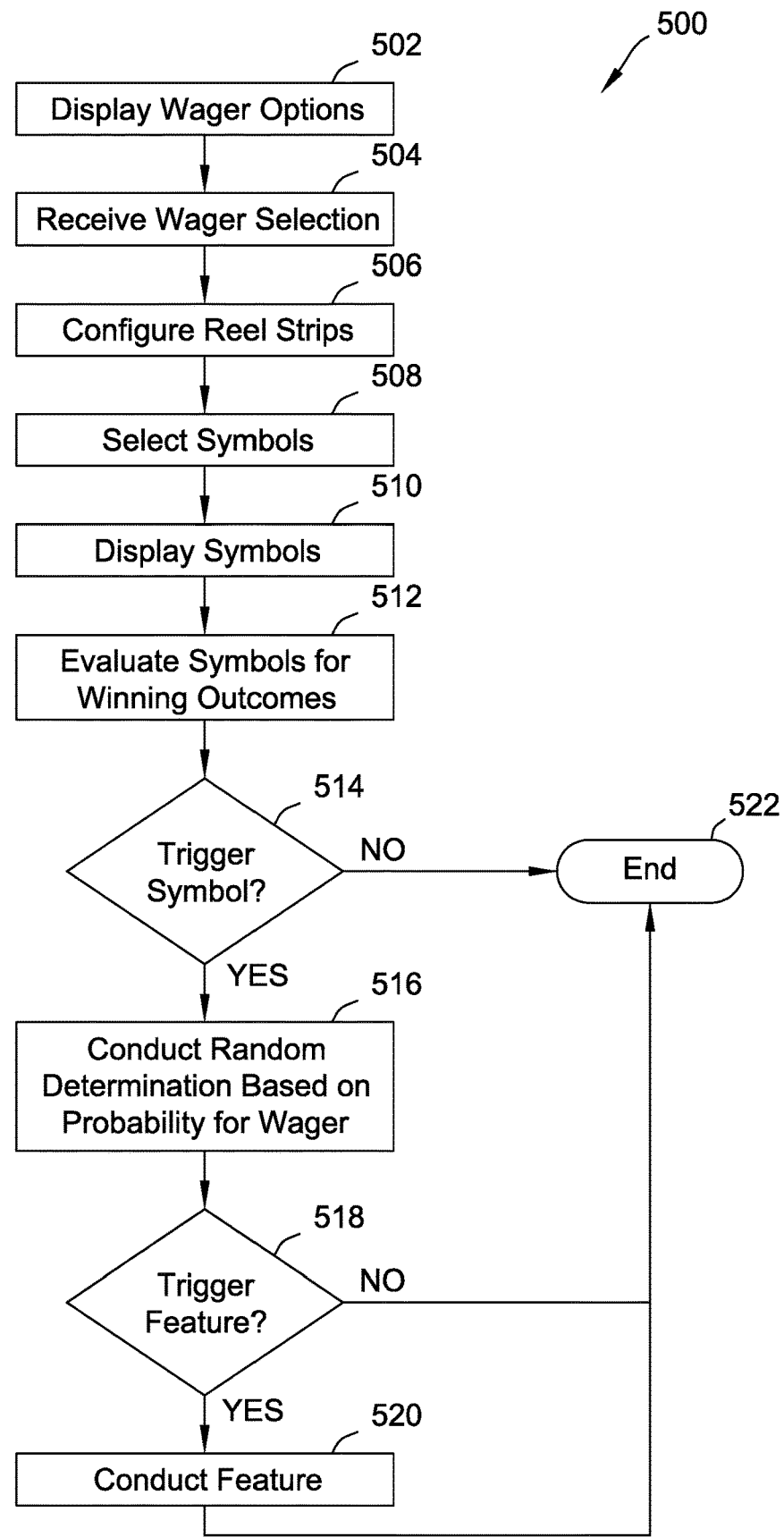
FIG. 5 is a flow chart of an example method of operating a gaming device an embodiment.
Figure 6:
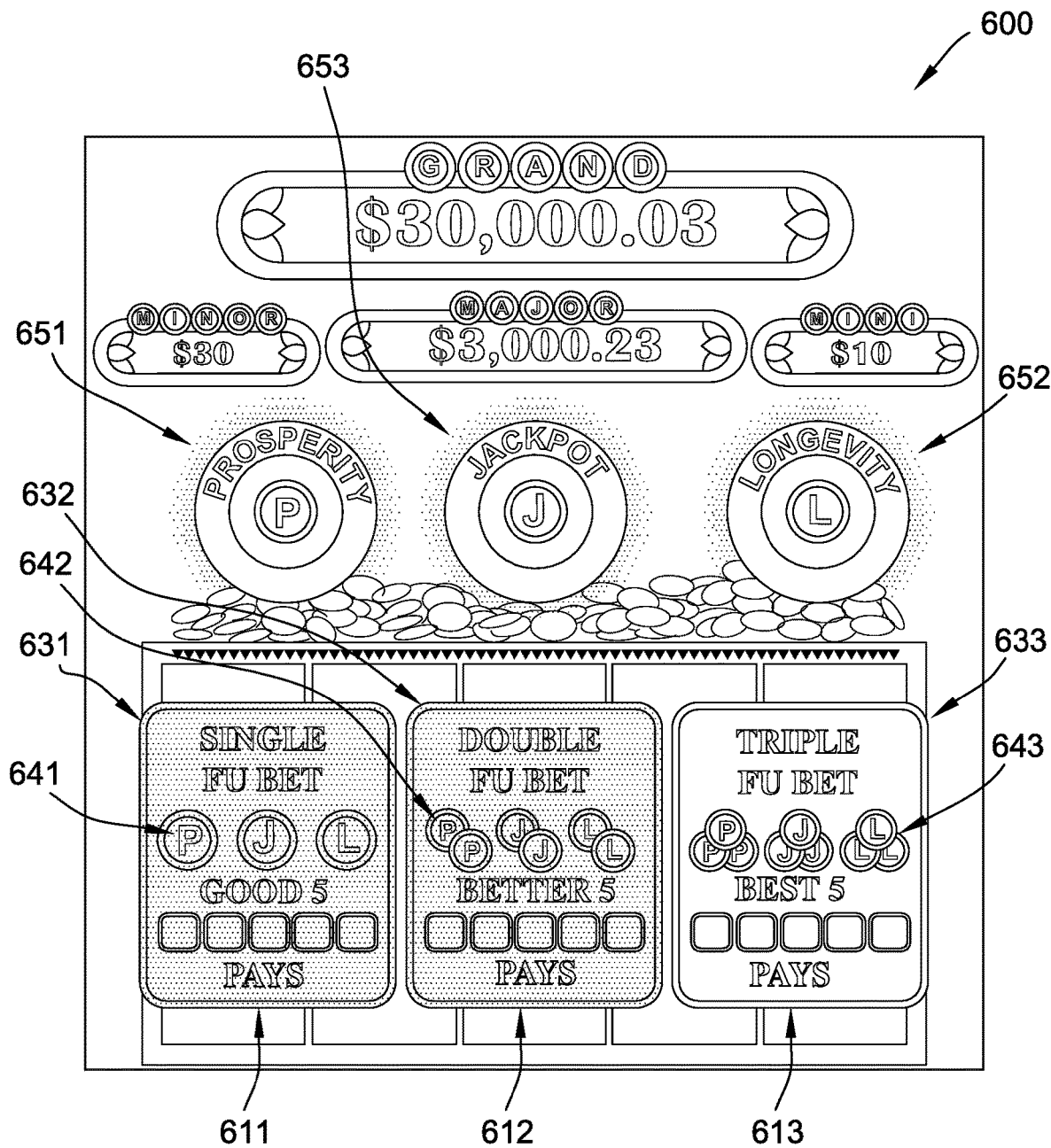
FIGS. 6 to 10 are example screen displays.

FIG. 5 is a flow chart of a method 500 of operating a gaming device 200 (shown in FIG. 2) of an embodiment. At step 502, instructions stored in memory 208 cause the processor 204 to control the display 240 to display a plurality of wager options. In this example, three wager options corresponding to wagers of 38 credits, 58 credits and 88 credits are displayed. FIG. 6 is an example screen display 600, illustrating display of the 38 credit wager option 611, the 58 credit wager option 612, and the 88 credit wager option 613. In the example of FIG. 6, the 88 credit wager option 613 has been selected. A game message 633 of the 88 credit wager option 613 indicates that the selection is a "Triple Fu Bet" reflecting that the triple symbol versions 643 of each trigger symbol will be used as the scatter symbols as described in further detail below. The 38 credit wager option 611 and the 58 credit wager option 612 are greyed-out to visually represent that the wager options 611 and 612 have not been selected. The greyed-out game message 631 of the 38 credit wager option 611 indicates that if it had been selected it would correspond to a "Single Fu Bet" reflecting that the single symbol versions 641 of each trigger symbol would have been used. Similarly, the greyed-out game message 632 of the 58 credit wager option 612 indicates that if it had been selected it would correspond to a "Double Fu Bet" reflecting that the double symbol versions 642 of each trigger symbol would have been used.

At step 504, the gaming device 200 receives the player's wager which is input as described above. In this example, the number of ways to win that will be evaluated is the same for each of the wager options described above. At step 506, processor 204 configures the reel strips for a current game instance based on the wager option using one of a plurality of symbol sets stored in memory 208. In this example, there are three symbol sets and each of the symbol sets comprises different versions of first, second and third trigger symbols that are processed as scatter symbols (SCAT1, SCAT2 and SCAT3); that is, the symbol position of the trigger symbols has no impact on how the symbols are evaluated. For example, SCAT1, SCAT2 and SCAT3 may be visually distinguished from one other in each version of the trigger/scatter symbol by being different colors to one another. In the illustrated example, SCAT1, SCAT2 and SCAT3 are visually distinguished from one other in each version of the trigger/scatter symbol by including either a "P," a "J," or an "L" on the symbol. As indicated above, a first version of each of scatter symbol is a single symbol version and these versions form the first set of scatter symbols; a second version of each of scatter symbol is a double symbol version and these versions form the second set of scatter symbols; and a third version is a triple symbol version and these versions form the third set of scatter symbols. The scatter symbols have common and different visual elements that communicate to the player their relationship to one another and other game elements. As indicated above, the colors (e.g., green, red and pink) or letters (e.g., P, J and L) of the scatter symbols distinguish them from one another but also indicate a visual connection to three features or gongs 651, 652, and 653 shown in the example screen display 600, and hence to feature games associated with the gongs 651-653. First gong 651 corresponds to a first feature game known as "Prosperity" feature game and has shared color elements with SCAT1 (e.g., green or P). Second gong 652 corresponds to the "Longevity" feature game and has shared color elements with SCAT3 (e.g., pink or L). Third gong 653 corresponds to a third feature game known as the "Jackpot" feature game and has shared color elements with SCAT3 (e.g., red or J). As indicated above, each of SCAT1, SCAT2 and SCAT3 share the common visual element of being composed of coin symbols but each version is distinguished by the visual element of the number of coin symbols, in this example the number being one, two or three coins symbols for the first, second and third versions respectively.

As indicated in relation to FIG. 6, the processor 204 accesses the set of scatter symbols to be used to configure the reel strips from memory 208 based on the selected wager option, such that in the example of FIG. 6, processor 204 uses the third set of symbols comprising the triple symbol versions of SCAT1, SCAT2 and SCAT3.

FIG. 3 illustrates an example of a set 300 of five reel strips 341, 342, 343, 344, 345. In the example, twenty-five reel strip positions 301-325 are shown for each reel strip 341-345 with reel strip position 330 indicating that the reel strips 341-345 may incorporate more reel strip positions. Each reel strip position of each reel has a symbol. For example, a "WILD" symbol occupies the fourth reel strip position 304 of the fourth reel 324. The configurability of the reel strips 341-345 is indicated by the dynamic scatter ("DYNSCAT") symbols, for example at fourteenth symbol position 314 of the first reel strip 341. In this example, dynamic scatter on each of the reel strips 341-345 but, in other examples, only some of the reel strips may comprise dynamic scatter symbols. Here, "dynamic" indicates that the symbols will be configured in at least each base game instance.

In an example, processor 204 performs an independent random determination using RNG 212 for each reel strip position occupied by DYNSCAT to select between the three trigger symbols of each set. In some examples, the determination is performed such that there is an equal chance of each symbol being selected. In other examples, the determination is performed using a weight table stored in memory 208 that defines relative probabilities of the three trigger symbols being selected.

Other reels strips to those illustrated in FIG. 3 can be used, for example, reel strips where two or more WILD symbols are placed at consecutive reel strip positions of a reel strip. In other examples, the reel strips could have between 30 and 100 reel strip positions. The actual length of the reel strips depends on factors such as the number of WILD symbols (in general, the more WILDs there are, the longer the reel strip needs to be to maintain the target RTP), the number of trigger symbols on each reel, and volatility (in general, the higher the prize value is, the longer the reel strip needs to be to lower the hit rate to maintain the target RTP).

Figure 4:
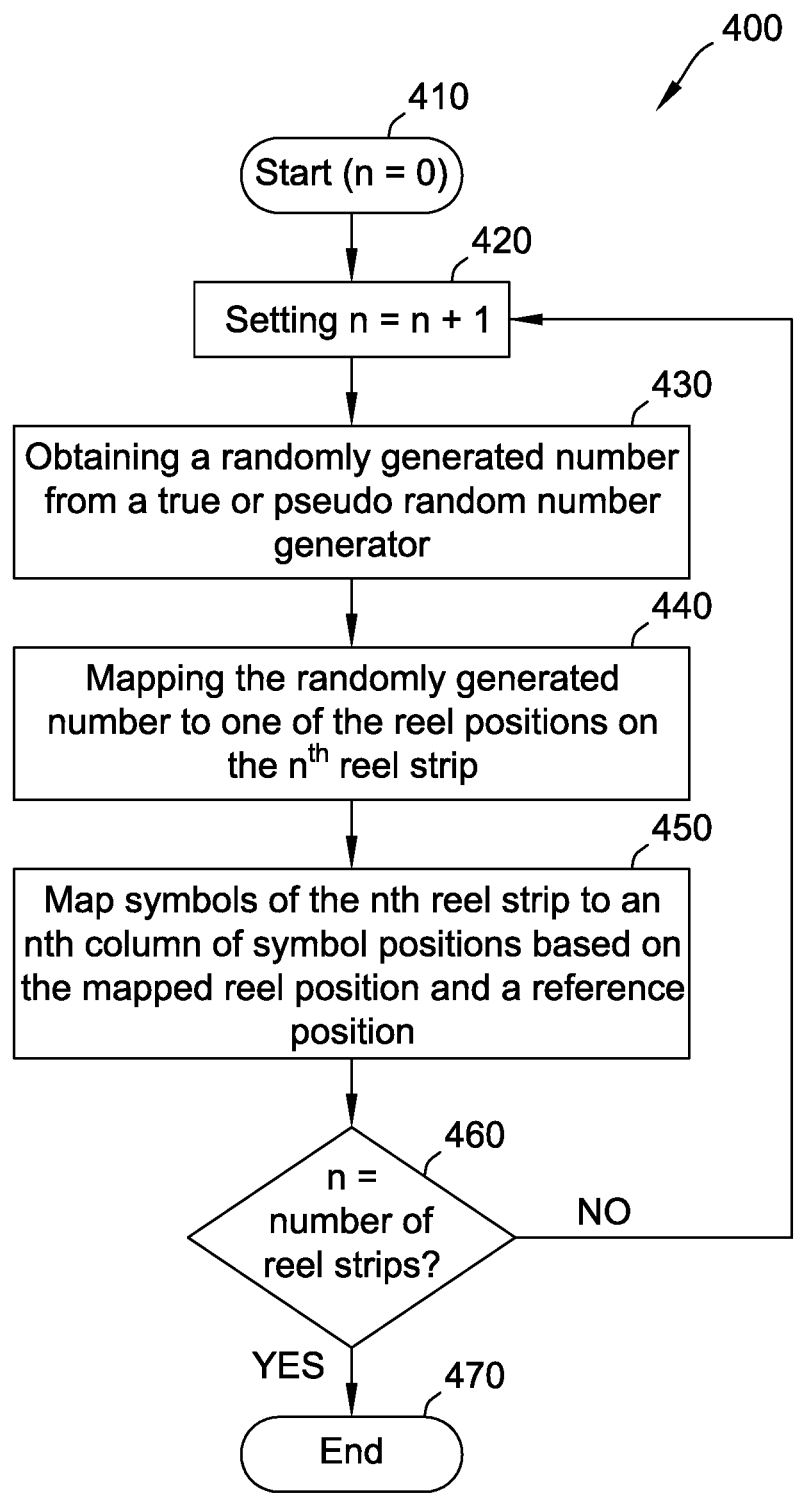
FIG. 4 is a flow chart an example method carried out by a processor to select symbols from reel strips.

At step 508 of the method 500 (FIG. 5), the processor 204 selects symbols from the configured reel strips. FIG. 4 is a flow chart of an example method 400 carried out by the processor 204 to select symbols from reel strips. At step 410 of the method 400, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430 the processor 204 obtains a randomly generated number from a true or pseudo random number generator 212. At step 440 the processor maps the generated number to one of the reel positions of the $n^{th}$ reel strip. In the first iteration, this is the first reel strip. To map the generated number to one of the reel strip positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the $n^{th}$ reel strip to and $n^{th}$ column of symbol display positions based on the mapped reel strip position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. That is, in effect, selecting one reel strip position selects a portion of the reel strip having three reel strip positions for display. Referring to the example reel strips of FIG. 3, if the value returned by the RNG 212 is mapped to thirteenth reel position 313 for the first reel strip 341, "10" symbol is mapped to a bottom symbol position, "PIC3" symbol of the twelfth reel position 312 is mapped to a middle symbol position, and "A" symbol of the eleventh reel position 311 is mapped to a top symbol position. It will be appreciated that the same technique can be used to select a different number of symbols from each reel strip by using a different number of neighboring reel strip positions. Indeed, in some example, embodiments, the number symbols mapped to symbol positions varies, e.g., when the processor 204 is implementing a feature game where the number of symbol positions in a column can vary.

At step 460 of the method 400 (FIG. 4), the processor 204 determines whether symbols have been selected for all of the reel strips 341-345 (FIG. 3), and if not the processor reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

In this example, after the symbols of all reel strips 341-345 have been mapped to symbol positions, at step 510 of the method 500 (FIG. 5), the processor 204 controls display 240 to display the selected symbols at the symbol positions.

Figure 7:
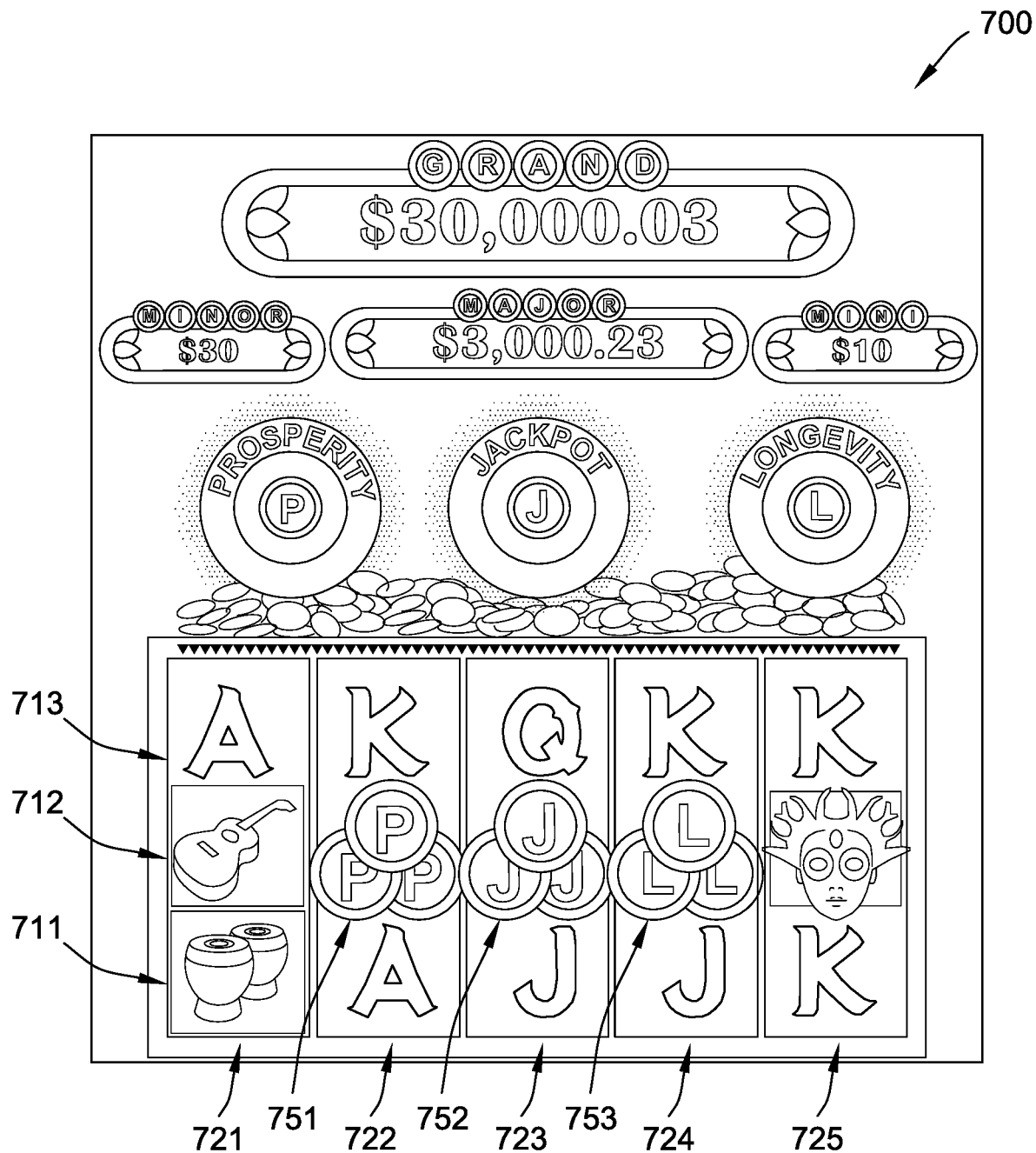

FIG. 7 is an example screen display 700 following such a selection. In this example, there are five columns 721, 722, 723, 724, 725 of three symbol positions 711, 712, 713 each arranged in a rectangular array such that there are also three full rows of symbol positions.

At step 512 of the method 500 (FIG. 5), the processor 204 evaluates the selected symbols for winning combinations based on a pay table stored in memory 208. In an example, the processor 204 employs a ways to win evaluation to determine whether a winning combination of symbols (e.g., three, four or five of a symbol included in the pay table) is formed by combining symbols at any position of a column 721-725 of the screen display 700 (FIG. 7). In an example, the processor 204 evaluates each pay line from left to right—i.e., the winning combination must start in the left most column 721. WILD symbols substitute for all other symbols in this evaluation. As a result, in this example there are 243 ways to win. The processor 204 makes an award for each winning combination based by adding an award to a win meter stored in memory 208.

As described above the reel strips 341-345 (FIG. 3) can be configured with three trigger symbols (SCAT 1, SCAT 2 and SCAT 3) with the version depending on the selected wager option. In the example screen display 700 shown in FIG. 7, where the third (88 credit) wager option 613 has been selected (as shown in FIG. 6), the select symbols include three triple symbol versions of the trigger symbols 751, 752, 753. In this example, a first triple symbol trigger symbol 751 corresponds to the Prosperity feature or gong 651, a second triple symbol trigger symbol 752 corresponds to the Longevity feature or gong 652, and a third triple symbol trigger symbol 753 corresponding to the Jackpot feature or gong 653. The Prosperity gong 651, the Longevity gong 652, and the Jackpot gong 653 are shown in each of the screen displays 600 and 700 of FIGS. 6 and 7, respectively, and are labeled in FIG. 6.

In an embodiment, the selection of a trigger symbol (e.g., trigger symbol 751, 752, and/or 753) associated with a specific feature game, results in a chance of triggering an associated free-game feature game. As indicated above, in an example, there are three feature games Ft1 (e.g., the Prosperity feature game), Ft2 (e.g., the Longevity feature game), and Ft3 (e.g., the Jackpot feature game). Where trigger symbols associated with more than one feature game are selected (as is the case in FIG. 7), in addition to there being a chance of triggering the respective feature game, there is a chance of triggering composite feature games. In the embodiment, composite feature games are feature games that combine game play characteristics of the individual feature games. In this example, there are four possible composite features (Ft 1+2, Ft 1+3, Ft 2+3, Ft 1+2+3). Whether an individual feature or composite feature is triggered depends on a weight table. In the embodiment, different weight tables are used depending on the selected wager option where the relative probability of triggering a feature is greatest for the third wager option 613, next highest for the second wager option 612, and lowest for the first wager option 611 as indicated by the different visual features of the trigger symbols.

An example weight table is set out in Table 1 below:

TABLE 1

|  | Ft1 | Ft2 | Ft3 | Ft (1 + 2) | Ft (1 + 3) | Ft (2 + 3) | Ft (1 + 2 + 3) | None | (sum) |
| --- | --- | --- | --- | --- | --- | --- | --- | --- | --- |
| Scat 1 | 0.5 | 0 | 0 | 0 | 0 | 0 | 0 | 0.5 | 1 |
| Scat 2 | 0 | 0.5 | 0 | 0 | 0 | 0 | 0 | 0.5 | 1 |
| Scat 3 | 0 | 0 | 0.5 | 0 | 0 | 0 | 0 | 0.5 | 1 |
| Scat 1&2 | 0.2 | 0.2 | 0 | 0.1 | 0 | 0 | 0 | 0.5 | 1 |
| Scat 1&3 | 0.2 | 0 | 0.2 | 0 | 0.1 | 0 | 0 | 0.5 | 1 |
| Scat 2&3 | 0 | 0.2 | 0.2 | 0 | 0 | 0.1 | 0 | 0.5 | 1 |
| Scat 1to3 | 0.1 | 0.1 | 0.1 | 0.08 | 0.04 | 0.04 | 0.04 | 0.5 | 1 |

In order, to implement this functionality, at step 514 of the method 500 (FIG. 5), the processor 204 determines whether the selected symbols include one or more trigger symbols (e.g., one or more of the trigger symbols 751, 752, and/or 753). In this respect, it will be appreciated step 514 can be carried out before or after the symbols are displayed. The processor 204 also determines the identity of each trigger symbol and uses the identity of the trigger symbol(s) to select a set of one or more trigger probabilities from the table at step 516. In this respect, referring to Table 1, in an example, where only a SCAT 1 is selected, processor 204 determines that a trigger probability of 0.5 applies to triggering the first feature game (Ft1), and hence there is a probability of 0.5 that no feature will trigger. In the example of FIG. 7, where each of SCAT 1, SCAT 2, and SCAT 3 are selected, a trigger probability of 0.1 applies to triggering a first feature game, a trigger probability of 0.1 applies to triggering a second feature game, a trigger probability of 0.1 applies to triggering a third feature game, a trigger probability of 0.08 applies to a first composite feature game having characteristics of the first and second feature games, a trigger probability of 0.04 applies to a second composite feature game having characteristics of the first and third feature games, a trigger probability of 0.04 applies to a third composite feature game having characteristics of the second and third feature games, and a trigger probability of 0.04 applies to a fourth composite feature game having characteristics of the first, second and third feature games.

Based on the assigned trigger probability or probabilities, the processor 204 assigns ranges of values returnable by RNG 212 to the respective feature games. The processor 204, then at step 518 of the method 500, determines a trigger outcome based on the trigger probability or probabilities for the current wager option by obtaining a value from RNG 212 and comparing the returned value to the assigned ranges. If the returned value corresponds a feature game, the processor 204 makes a positive determination at step 518 to trigger and the feature game and, after controlling the display 240 to indicate that feature game is awarded conducts 520 the relevant feature game. In the example, of Table 1, a possible trigger outcome for all combinations of trigger symbols is that no feature game is triggered. In an example, the determination at step 516 is conducted independently for each trigger symbol such that processor 518 may trigger more than one feature game. In an example, if more than one feature game is awarded, they are conducted in the order in which they are triggered. After the feature game(s) are conducted, the process of the method 500 ends and processor 204 awaits a further wager selection.

It will be appreciated that in another example, the weight table may associate ranges of values returnable from the RNG 212 with specific outcomes rather than specifying probabilities.

Table 1 is only one example where N=3 is the number of trigger symbols and there are up to 2^N−1=7 triggerable features plus a probability of triggering no feature. In an alternative example, a feature game may trigger each time a trigger symbol lands, such that the processor 204, effectively only determines a trigger outcome that defines which of the 2^N−1=7 triggerable features will trigger, not whether a feature will trigger.

In another example, where N=2 there may only be two trigger symbols and up to 2^N−1=3 triggerable features, with or without a probability of triggering no feature. In another example, there may be more than three trigger symbols. In an example, not all possible combinations of trigger symbols are mapped to a feature game. For example, where N=4, in one example, there are feature games associated with each individual trigger symbol and each combination of two trigger symbols but not with combinations of three or more trigger symbols.

Figure 8:
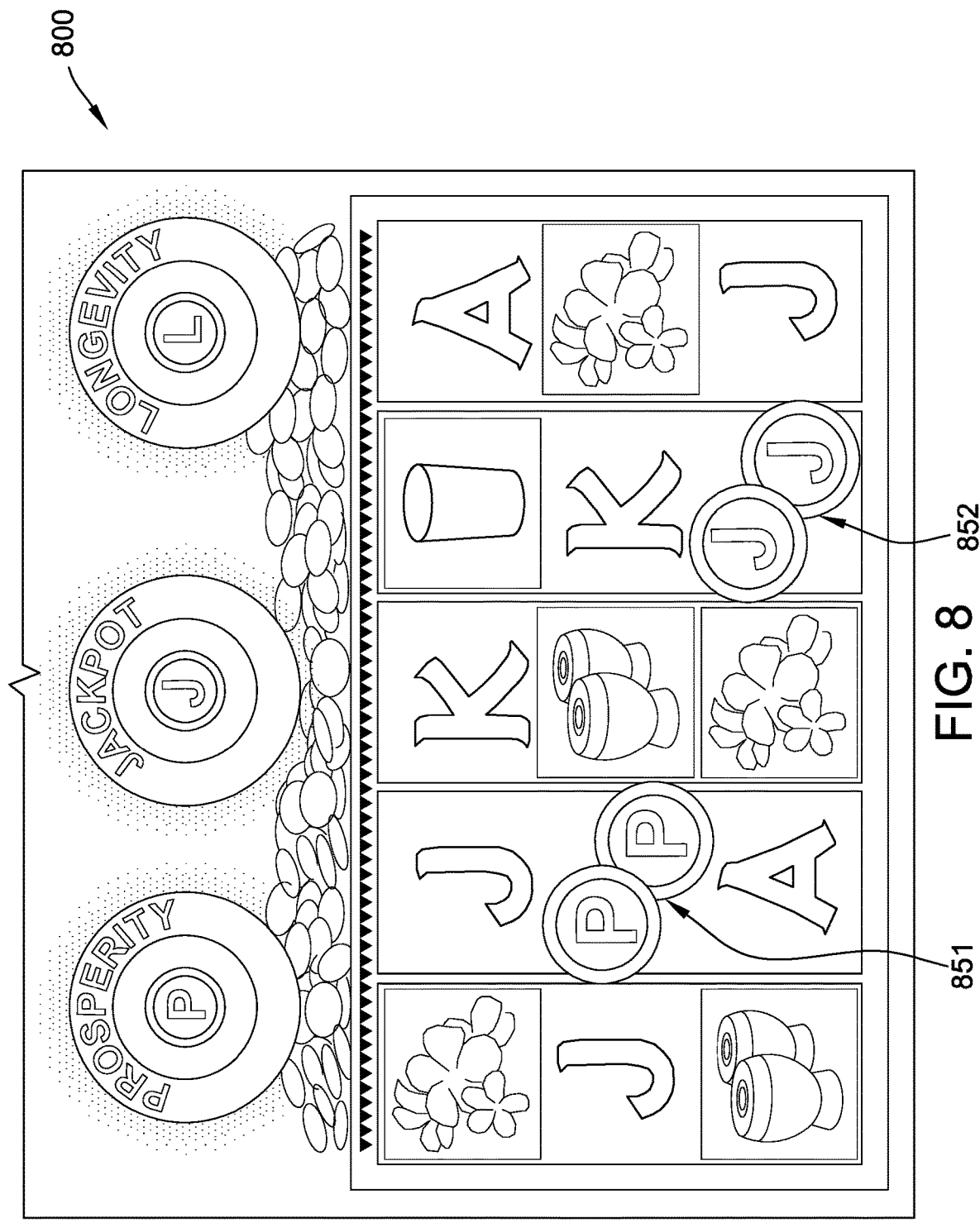

As described above, in this example, there are two other versions of the trigger symbols. FIG. 8 is an example screen display 800 where the double symbol versions of trigger symbols are in used due to selection of second wager option 612 (shown in FIG. 6). In this example, a first trigger symbol 851 corresponding to the first feature game and a second trigger symbol 852 corresponding to the second feature game have been selected. In this example, each trigger symbol 851, 852 includes two coin symbols to indicate the relatively lower probability of triggering the feature game relative to the trigger symbols 751, 752, and/or 753 in the example shown in FIG. 7.

Figure 9:
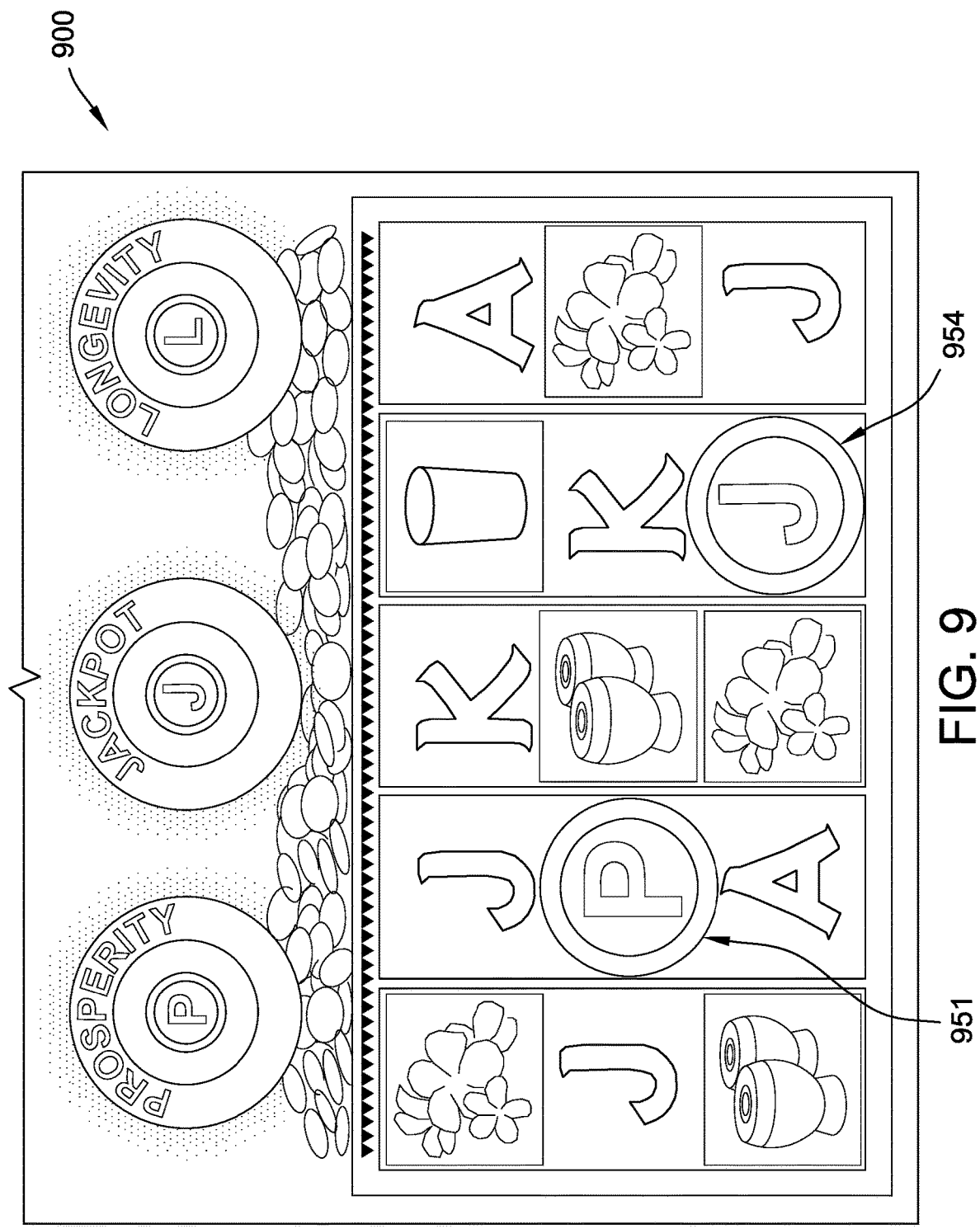

FIG. 9 is an example screen display 900 where the single symbol versions of trigger symbols are in used due to selection of first wager option 611 (shown in FIG. 6). In this example, a first trigger symbol 951 corresponding to the first feature game and a second trigger symbol 952 corresponding to the second feature game have been selected. In this example, each trigger symbol 951, 952 includes a single coin symbol to indicate the relatively lower probability of triggering the feature game relative to the trigger symbols 751, 752, and/or 753 in the example shown in FIG. 7 and the trigger symbols 851 and/or 852 in the example shown in FIG. 8.

The visual elements of the different versions of each trigger symbol as shown in the wager options 611-613 (FIG. 6) and on the reel strips configured with trigger symbols corresponding the selected wager option in the example screen displays 700-900 advantageously provide a player interface on display 240 that indicates the relative probability of triggering one or more of the feature games in a manner that reduces the mental burden on the player to understand the relative probabilities both within the game and when selecting a wager option. Moreover, the visual elements advantageously present information on the display 240 related to the backend processing performed by the processor 204 that would not otherwise be known by or provided to a player.

An example set of feature games and how their characteristics are combined to form composite features is set out below.

Feature 1 (Reel Growth—the "Prosperity Feature")

In this example, Feature 1 (Ft1) is triggerable based on an assigned trigger probability when SCAT1 is a selected trigger symbol. When Feature 1 is triggered, 5 free games are awarded. During Feature 1 the array of symbol positions shown in screen display 700 of FIG. 7 "grows" so that there are five symbol positions in the second column 722, third column 723 and fourth column 724. As a result, more symbols will be selected for these columns 722-724 and more ways to win will be evaluated by processor 204, in this example 3×5×5×5×3=1123 ways to win. In this example, a further feature game may be triggered during Feature 1.

Feature 2 (Additional Games and Multipliers—the "Longevity Feature")

Feature 2 (Ft2) is triggerable based on an assigned trigger probability when SCAT2 is a selected trigger symbol. When Feature 2 is triggered, 5 free games are awarded. During Feature 2, every SCAT2 symbol that is selected awards 1 free game, 2 free games or a bonus credit prize. These selections are made by the processor 204 from a weight table in memory 208 without replacement such that, for example, once all possible instances of awarding 2 free games have occurred (assuming this happens first), any future occurrences of a SCAT 2 symbol, will either result in the award of 1 free game or a bonus credit prize. A multiplier is applied to all wins where WILD substitutes during Feature 2. In this example, a further feature game may be triggered during Feature 2.

Feature 3 (the "Jackpot Feature")

Feature 3 is triggerable based on an assigned trigger probability when SCAT3 is a selected trigger symbol. When Feature 3 is triggered, 10 free games are awarded. SCAT1, SCAT2 and SCAT3 symbols are replaced on the reel strops by a "GOLD SCAT" symbol during this feature. The "GOLD SCAT" symbol is a "configurable symbol" because the symbol it will show is determined dynamically by selecting from a number of possible "configuring symbols"—i.e., a set of symbols that can take the place of a "GOLD SCAT" symbol or be displayed at the reel strip position on the reel strip where the GOLD SCAT symbol is placed.

Each GOLD SCAT appearing when configured with a configuring symbol reveals either a credit prize or a letter which is a component of at least one prize. In an example, the letters "M" "I" "N" "A" "J" "O" "R" "G" "N" "D" correspond to the prizes GRAND, MAJOR, MINOR, and MINI. In one example, there are separate symbols for each of the prizes. In an example, different colors are used for each prize—e.g., there are three different colored "M" configuring symbols. The configuring symbols are selected by processor 204 using RNG 212 and at least one weight table.

Any credit prize appearing during the free games is instantly awarded.

Progress toward the award of each awardable prize (such as progressive jackpots, bonus prizes or a mixture of progressive prizes and bonus prizes) is indicated by displaying the names: GRAND, MAJOR, MINOR and MINI with letters yet to have been selected greyed-out and letters that have been selected in color.

If a letter is selected from the reel strips, it is counted towards spelling one of the progressive names. When the name of the progressive is completely collected, the respective progressive is awarded.

In an example, there are tables for each of the "GRAND/MAJOR/MINOR/MINI" prizes. As described in further detail below the tables are used "without replacement" and contain a set of undetermined, reference letters as well as credit prizes.

After any prize is awarded the progress indicated by the prize name is reset by the processor (here by greying all the letters out) and the prize can potentially be won again during the remainder of the feature. Weight tables are reset if all configurable symbols within the weight table have been used.

A further feature cannot be triggered during this feature.
Composite (or "Super") Feature 1 Derived from Feature 1+Feature 2

A number of game play characteristics of Feature 1 are incorporated into Super Feature 1, including that 5 free games are awarded, the number of symbols selected for middle columns 722-724 (FIG. 7) of symbol positions grows to five symbol positions high and the number of ways to win increases. A number of characteristics from Feature 2 are incorporated too. Specifically, every SCAT2 that appears during the feature awards 1 free game, 2 free games or a bonus credit prize as described above. Further, a random multiplier is awarded to all wins in which WILD substitutes. The value of the multiplier is 3. An additional feature game may be triggered from Super Feature 1.

Composite (or "Super") Feature 2 Derived from Feature 1+Feature 3

When Super Feature 2 is awarded, 10 free games are awarded (from Feature 3). SCAT1, SCAT2 and SCAT3 are replaced by GOLD SCAT during this feature (from Feature 3) and the array of symbol positions "grows" so that there are five symbol positions in the second column 722, third column 723 and fourth column 724 such that more ways to win are evaluated (from Feature 1).

As in Feature 3, each GOLD SCAT appearing has a configuring symbol which is either a credit prize or a letter "M" "I" "N" "A" "J" "O" "R" "G" "N" "D" which is a component of a prize that can be awarded if all letters are collected in the manner described above. A further feature cannot be triggered during this feature.

Composite (or "Super") Feature 3 Derived from Feature 2+Feature 3

In Super Feature 3, 10 free games are awarded. As described in relation to Feature 3, SCAT1, SCAT2 and SCAT3 are replaced by the configurable symbol GOLD SCAT and each GOLD SCAT appearing is configured by a configuring symbol which is either a credit prize or a letter "M" "I" "N" "A" "J" "O" "R" "G" "N" "D" that is a component of a prize that can be collected in the manner described above in relation to the Jackpot Feature.

A further feature cannot be triggered during this feature.

Composite Feature 4 (or "Mega Feature") Derived from Feature 1, Feature 2 and Feature 3.

Figure 10:
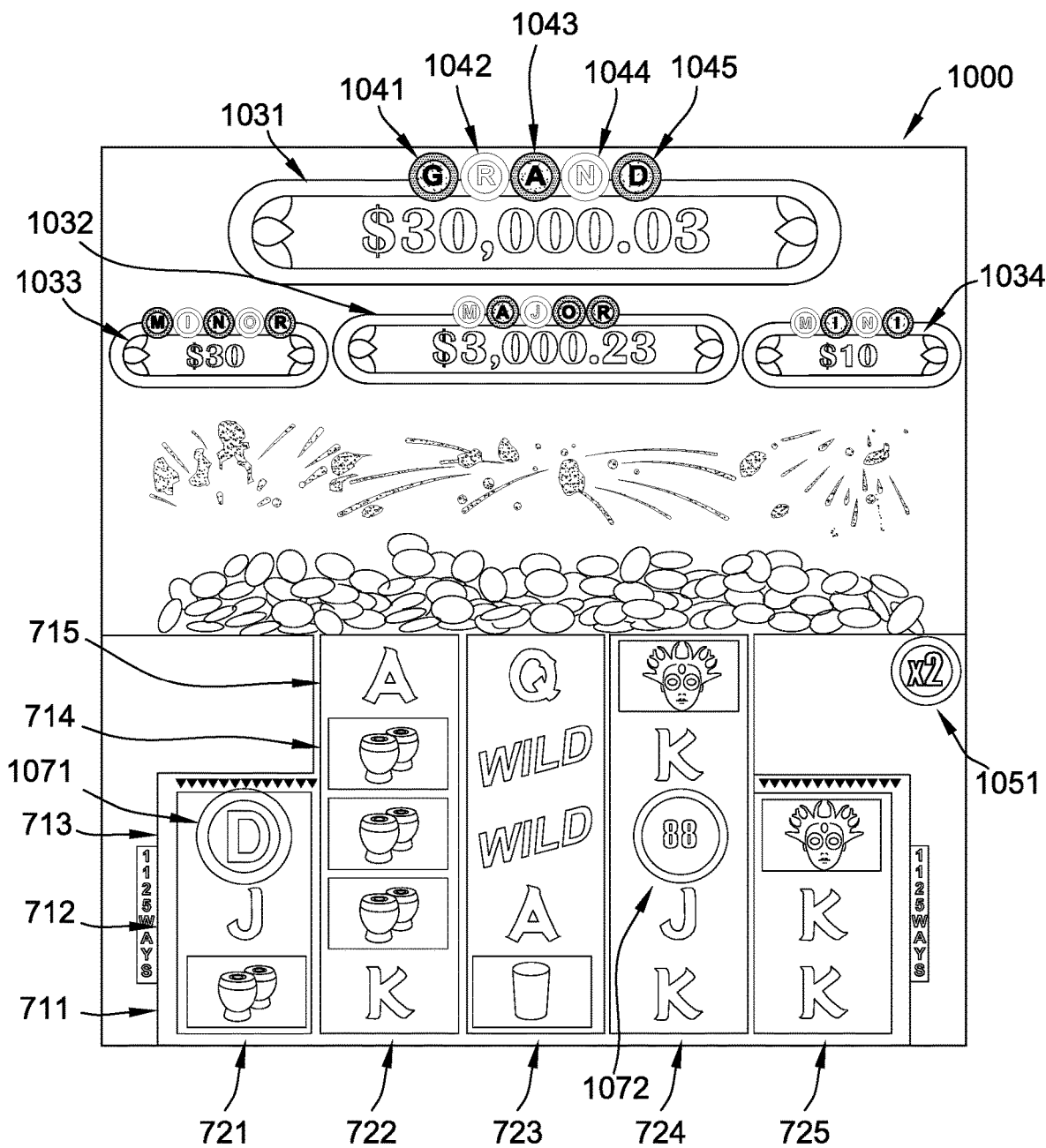

The Mega Feature combines game play characteristics of all the base feature games. FIG. 10 is an example screen display 1000 during play of the Mega Feature. As in Feature 3, 10 free games are awarded. The game play characteristics from Feature 1 is that the array of symbol positions "grows" so that there are five symbol positions in the second column 722, third column 723 and fourth column 724 such that more ways to win are evaluated; as shown in FIG. 10, this has the effect that two-partial rows 714, 715 of symbol positions.

The configurable GOLD SCAT symbol and prize component collection characteristics from Feature 3 are incorporated too. FIG. 10 shows that there are prize indicators 1031, 1032, 1033, 1034 that indicate the value of the mini bonus prize 1034, minor bonus prize 1033, major progressive jackpot 1032, and grand progressive jackpot 1031. Each prize indicator 1031-1034 is configured to indicate progress of prize component collection for the respective prize. By way of example, grand progressive prize jackpot indicator 1031 has five collection indicators 1041, 1042, 1043, 1044, 1045 corresponding to the five letters that are the prize components that make up the word "GRAND". When a letter is collected the relevant collection indicator is "lit-up" while the other collection indicators remain greyed-out. In this example, the collection indicators 1041, 1043, 1045 corresponding respective to the letters "G", "A" and "D" are lit-up to indicate that these letters have been collected. FIG. 10 also shows an example of a prize component symbol 1071 (here the letter "D" component of the grand prize) and a credit prize symbol for 88 credits 1072.

As in Feature 2, if WILD appears in a winning combination a random multiplier is applied, in this example a ×2 multiplier 1051. A further feature game cannot be triggered during the Mega Feature.

Referring, again to FIG. 6, in some examples the features or gongs 651-653 have different states indicative of how many trigger symbols have appeared since the respective feature was last triggered.

In one example, each gong 651-653 has five possible states as set out in Table 2.

TABLE 2

| State of gong | Number of trigger symbols that have appeared | | |
| --- | --- | --- | --- |
| | Gong 651 | Gong 652 | Gong 653 |
| 1 | 0-2 | 0-2 | 0-2 |
| 2 | 3-5 | 3-5 | 3-5 |
| 3 | 6-13 | 6-13 | 6-13 |
| 4 | 14-32 | 14-32 | 14-32 |
| 5 | 33+ | 33+ | 33+ |

As each trigger symbol is displayed, an animation indicates to the player that they have a chance to trigger a feature game by showing the relevant trigger symbol as striking the gong 651-653 associated with the trigger symbol.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the implementations described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the implementations described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary implementation, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

In the claims which follow and in the preceding description, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments.

What is claimed is:

1. A gaming device comprising:
   an input device operable to select between a plurality of wager options;
   a random number generator;
   a display;

a processor; and a memory storing (a) symbol data comprising (i) a plurality of reel strips, at least some of the plurality of reel strips comprising dynamically configurable reel strip positions to be configured with trigger symbols including a first trigger symbol associated with a first feature game and a second trigger symbol associated with a second feature game; (ii) a plurality of sets of trigger symbols, each including a different version of the first trigger symbol and the second trigger symbol, each of the plurality of sets of trigger symbols corresponding to a different one of the plurality of wager options; (b) trigger probability data for each of the plurality of wager options; and (c) instructions which when executed by the processor cause the processor to:

(a) receive a user input indicative of a wager option selected from the plurality of wager options;

(b) configure the reel strips by selecting, using the random number generator, a trigger symbol from a set of the plurality of sets of trigger symbols corresponding to the user input for each of the dynamically configurable reel strip positions;

(c) select symbols from the configured reel strips for display in a plurality of columns of symbol positions, wherein each column of symbol positions corresponds to a reel strip of the plurality of reel strips;

(d) control the display to display the selected symbols on the display in the plurality of columns of symbol positions;

(e) in response to the selected symbols including at least one of the first trigger symbol or the second trigger symbol, determine, using the random number generator, whether a trigger condition associated with one of a plurality of feature games is satisfied, wherein the determination by the random number generator is performed based on the trigger probability data for the selected wager option and an identity of the one or both of the first and second trigger symbols, wherein the plurality of feature games comprises a first composite feature game comprising at least one game play characteristic of the first and second feature games, the trigger condition associated with the first composite feature game being satisfied when the selected symbols include both of the first and second trigger symbols; and (f) upon the trigger condition being satisfied, conduct the feature game associated with the trigger condition.

2. The gaming device of claim 1, wherein the trigger symbols include a third trigger symbol associated with a third feature game and each of the plurality of sets of trigger symbols includes a different version of the third trigger symbol.

3. The gaming device as claimed in claim 2, wherein:
the plurality of feature games comprises a second composite feature comprising at least one game play characteristic of the first, second and third feature games, the trigger condition of the second composite feature being met when the selected symbols include the first, second and third trigger symbols.

4. The gaming device of claim 1, wherein each different version of each of the first and second trigger symbols comprises at least one visual element that indicates a ranking of relative trigger probabilities for the plurality of wager options.

5. The gaming device as claimed in claim 4, wherein each different version of a same trigger symbol comprises at least one common visual element that indicates that the same trigger symbol corresponds to a same feature game.

6. The gaming device as claimed in claim 5, wherein the at least one visual element that indicates the ranking of relative trigger probabilities is a different number of the at least one common visual element, wherein a greater number of the at least one common visual element indicates a relatively higher trigger probability.

7. A method of operating a gaming device comprising an input device operable to select between a plurality of wager options, a random number generator, a display and a memory storing (a) symbol data comprising (i) a plurality of reel strips, at least some of the plurality of reel strips comprising dynamically configurable reel strip positions to be configured with trigger symbols including a first trigger symbol associated with a first feature game and a second trigger symbol associated with a second feature game; (ii) a plurality of sets of trigger symbols, each including a different version of the first trigger symbol and the second trigger symbol, each of the plurality of sets of trigger symbols corresponding to a different one of the plurality of wager options; and (b) trigger probability data for each of the plurality of wager options, the method comprising:

(a) receiving a user input indicative of a wager option selected from the plurality of wager options;

(b) configuring the reel strips by selecting, using the random number generator, a trigger symbol from a set of the plurality of sets of trigger symbols corresponding to the user input for each of the dynamically configurable reel strip positions;

(c) selecting symbols from the configured reel strips for display in a plurality of columns of symbol positions, wherein each column of symbol positions corresponds to a reel strip of the plurality of reel strips;

(d) controlling the display to display the selected symbols on the display in the plurality of columns of symbol positions;

(e) in response to the selected symbols including at least one of the first trigger symbol or the second trigger symbol, determining, using the random number generator, whether a trigger condition of one of a plurality of feature games is satisfied, wherein the determination by the random number generator is performed based on the trigger probability data for the selected wager option and an identity of the one or both of the first and second trigger symbols, wherein the plurality of feature games comprises a first composite feature game comprising at least one game play characteristic of the first and second feature games, the trigger condition associated with the first composite feature game being satisfied when the selected symbols include both of the first and second trigger symbols; and (f) upon the trigger condition being satisfied, conducting the feature game associated with the trigger condition.

8. The method of claim 7, wherein the trigger symbols include a third trigger symbol associated with a third feature game and each of the plurality of sets of trigger symbols includes a different version of the third trigger symbol.

9. The method as claimed in claim 8, wherein:
the plurality of feature games comprises a second composite feature comprising at least one game play characteristic of the first, second and third feature games, the trigger condition of the second composite feature being satisfied when the selected symbols include the first, second and third trigger symbols.

10. The method of claim 7, wherein each different version of each of the first and second trigger symbols comprises at least one visual element that indicates a ranking of relative trigger probabilities for the plurality of wager options.

11. The method as claimed in claim 10, wherein each different version of a same trigger symbol comprises at least one common visual element that indicates that the same trigger symbol corresponds to a same feature game.

12. The method as claimed in claim 11, wherein the at least one visual element that indicates the ranking of relative trigger probabilities is a different number of the at least one common visual element, wherein a greater number of the at least one common visual element indicates a relatively higher trigger probability.

13. A player interface for a gaming device comprising:
an input device operable to receive a user input indicative of a wager option selected from a plurality of wager options;
an electronic display; and
a plurality of reel strips for visual output to the display, at least some of the plurality of reel strips comprising dynamically configurable reel strip positions configured, based on the selected wager option, with trigger symbols for triggering a plurality of feature games, wherein the selected wager option determines which set of trigger symbols of a plurality of sets of trigger symbols is used to configure the reel strips, each set of trigger symbols enabling triggering of at least one of the plurality of feature games, and each set of trigger symbols comprising a different version of at least a first trigger symbol,
wherein the plurality of feature games comprises a first composite feature game comprising at least one game play characteristic of a subset of the plurality of feature games, a trigger condition associated with the first composite feature game including selecting a subset of trigger symbols associated with the subset of the plurality of feature games,
wherein each different version of a respective trigger symbol comprises at least one visual element that indicates a ranking of relative probabilities of triggering the plurality of feature games based on the selected wager option when visually output on the electronic display.

14. The player interface as claimed in claim 13, wherein the first trigger symbol enables triggering of at least a first feature game and each set of trigger symbols comprises a different version of a second trigger symbol that enables triggering of at least a second feature game.

15. The player interface as claimed in claim 14, wherein each set of trigger symbols comprises a different version of a third trigger symbol that enables triggering of at least a third feature game.

16. The player interface as claimed in claim 14, wherein each different version of a same trigger symbol comprises at least one common visual element that indicates that the same trigger symbol corresponds to a same feature game.

17. The player interface as claimed in claim 16, wherein the at least one visual element that indicates the ranking of the relative probabilities of triggering the plurality of feature games is a different number of the at least one common visual element, wherein a greater number of the at least one common visual element indicates a relatively higher probability of triggering the plurality of feature games.

18. The player interface as claimed in claim 17, wherein the input device comprises individual virtual buttons that visually indicate each of the plurality of wager options and a number of the at least one common visual element for the respective wager options.

* * * * *